United States Patent
Numajiri et al.

(10) Patent No.: US 8,186,956 B2
(45) Date of Patent: May 29, 2012

(54) SEMI-FLEXIBLE SUPPORTING STRUCTURE FOR WIND TURBINE

(75) Inventors: Tomohiro Numajiri, Tokyo (JP); Emi Torii, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/860,864

(22) Filed: Aug. 21, 2010

(65) Prior Publication Data

US 2011/0280730 A1  Nov. 17, 2011

Related U.S. Application Data (63) Continuation of application No. PCT/JP2010/058211, filed on May 14, 2010.

(51) Int. Cl.
*F03B 3/12* (2006.01)

(52) U.S. Cl. ........ 416/147; 416/148; 416/149; 416/154; 416/158; 416/170 R; 415/4.2; 415/4.4; 415/124.1

(58) Field of Classification Search .............. 415/4.2, 415/4.4, 124.1; 416/48, 147, 148, 149, 154, 416/158, 170 R; 290/44, 55
See application file for complete search history.

(56) References Cited

U.S. PATENT DOCUMENTS

| | | | | |
|---|---|---|---|---|
| 3,037,559 A | * | 6/1962 | Blackburn | 416/48 |
| 3,902,822 A | * | 9/1975 | Andrews et al. | 416/170 R |
| 5,249,924 A | * | 10/1993 | Brum | 416/48 |
| 6,790,156 B2 | * | 9/2004 | Hosle | 475/331 |
| 7,090,465 B2 | * | 8/2006 | Flamang et al. | 416/170 R |
| 7,335,128 B2 | * | 2/2008 | Flamang et al. | 475/331 |
| 2006/0188371 A1 | * | 8/2006 | Christensen et al. | 416/147 |

FOREIGN PATENT DOCUMENTS

| | | |
|---|---|---|
| JP | 57-148073 A | 9/1982 |
| JP | 01-273880 A | 11/1989 |
| JP | 3-127082 U | 12/1991 |
| JP | 06-288336 A | 10/1994 |
| JP | 08-035482 A | 2/1996 |
| JP | 08-093630 A | 4/1996 |
| JP | 2000-110705 A | 4/2000 |
| JP | 2002-031031 A | 1/2002 |
| JP | 2008-128135 A | 6/2008 |

OTHER PUBLICATIONS

Search Report for PCT/JP2010/058211 mailed Aug. 10, 2010.

* cited by examiner

*Primary Examiner* — Igor Kershteyn (74) *Attorney, Agent, or Firm* — Kanesaka Berner & Partners, LLP (57) ABSTRACT

A frame for supporting equipment arranged in a hub of a wind turbine is fixed to the hub at one end and flexibly connected to the hub at another end. The variation of the relative position between the hub and the frame caused by the deformation of the hub associated with a rotation of the wind turbine or the like is absorbed by the flexible connection. A wind turbine whose frame in the hub has high durability against the rotation can be provided.

8 Claims, 7 Drawing Sheets

SEMI-FLEXIBLE SUPPORTING STRUCTURE FOR WIND TURBINE

CROSS-REFERENCE TO RELATED APPLICATION

This is a continuation application of International Application No. PCT/JP2010/058211, filed on May 14, 2010.

TECHNICAL FIELD

The present invention relates to a structure of a wind turbine.

BACKGROUND ART

Figure 1:
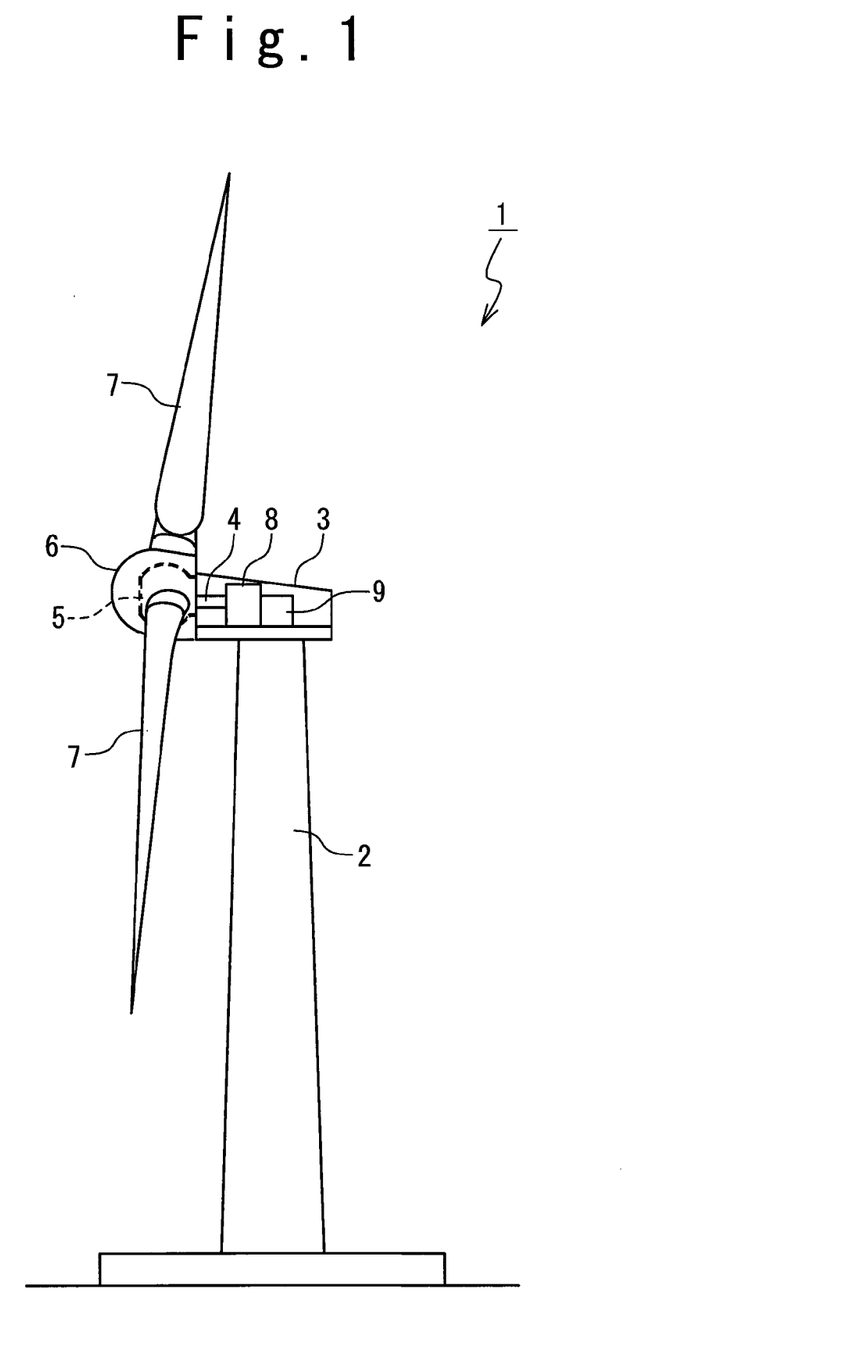
FIG. 1 shows a configuration of a wind turbine.

A wind turbine for wind turbine generator has been used. FIG. 1 shows an example of a configuration of the wind turbine. A tower 2 is fixed vertical to the ground. A nacelle 3 is supported on the tower 2. A hub 5 is rotatably supported by the nacelle 3 in a horizontal direction via a main shaft 4. The hub 5 is covered with a cover 6. Blades 7 are attached to the hub 5.

At power wind generation, the pitch angle of the blade 7 is controlled so as to efficiently convert wind power to torque. When the blade 7 receives wind, the main shaft 4 rotates. The rotation is accelerated by a gear box 8. The accelerated rotation causes a generator 9 to generate electric power.

Patent Document 1 is cited as a reference technique relating to the configuration of a hub.

CITATION LIST

Patent Document

Patent Document 1: Japanese Patent Application Publication JP 2008-128135 A

SUMMARY OF INVENTION

A certain weight of mechanical equipment such as equipment for pitch driving/control for the blade 7 is disposed within the hub 5. Since the hub 5 rotates about the main shaft 4 which is substantially horizontally oriented, a frame that mounts the equipment thereon is subjected to repetitive loads accompanied with the rotation. Furthermore, the hub 5 is slightly deformed by the rotation and wind loads applied to the blade. Thus, the frame in the hub 5 is required to be durable to such deformation. Especially with an increase in the size of the wind turbine in these years, it is assumed that the configuration of the frame subjected to the influence of such deformation will become more important. There is a demand for the frame that supports equipment disposed in the hub and is highly durable to rotation. However, when the frame with rigid structure is merely manufactured, the structure needs to be able to support loads applied to the hub, disadvantageously resulting in an increase of weight and size.

According to an aspect of the present invention, a wind turbine converts a wind power into a torque by a blade attached to a hub. The wind turbine includes a frame for supporting equipment disposed in the hub, a fixation part for fixing one end of the frame to the hub and a connection part for connecting another end of the frame to the hub with a flexible connection.

According to another aspect of the present invention, at the connection part, the frame is flexibly connected to the hub in a pivotal direction.

According to still another aspect of the present invention, a connection part includes: a flange fixed to a wall of the hub and having a hole; and a spherical bearing fixed inside the hole. The frame includes a pin connected to an end of the frame on a side of the connection part. The connection part forms the flexible connection in the pivotal direction by supporting the pin by the spherical bearing.

According to still another aspect of the present invention, the hole penetrates the flange. A through hole is formed in the wall of the hub at the connection part. The flange is attached to an external surface of the hub to cover the through hole. An end of the structural beam on the side of the connection part is disposed inside the through hole.

According to still another aspect of the present invention, the flange is fixed to an internal surface of the hub. The flange includes a recess portion that encloses one end of the structural beam on a side of the connection part.

According to still another aspect of the present invention, a gap is formed between the structural beam and the flange.

According to still another aspect of the present invention, the spherical bearing is a radial bearing. The connection part forms a flexible connection in a longitudinal direction of the frame by the pin being slidably connected to the spherical bearing in a thrust direction.

According to still another aspect of the present invention, the frame is connected to the hub flexibly in a longitudinal direction of the frame at the connection part.

According to still another aspect of the present invention, equipment includes an accumulator of a hydraulic system for changing a pitch of the blade attached to the hub or a control board for controlling an operation of the wind turbine.

According to the present invention, a wind turbine having a frame that supports equipment disposed in the hub and is highly durable to rotation.

BRIEF DESCRIPTION OF DRAWINGS

The above-mentioned objects and other objects, effects and features of the present invention will become more apparent from description of an embodiment in combination with accompanying drawings, in which.

DESCRIPTION OF EMBODIMENTS

Figure 2:
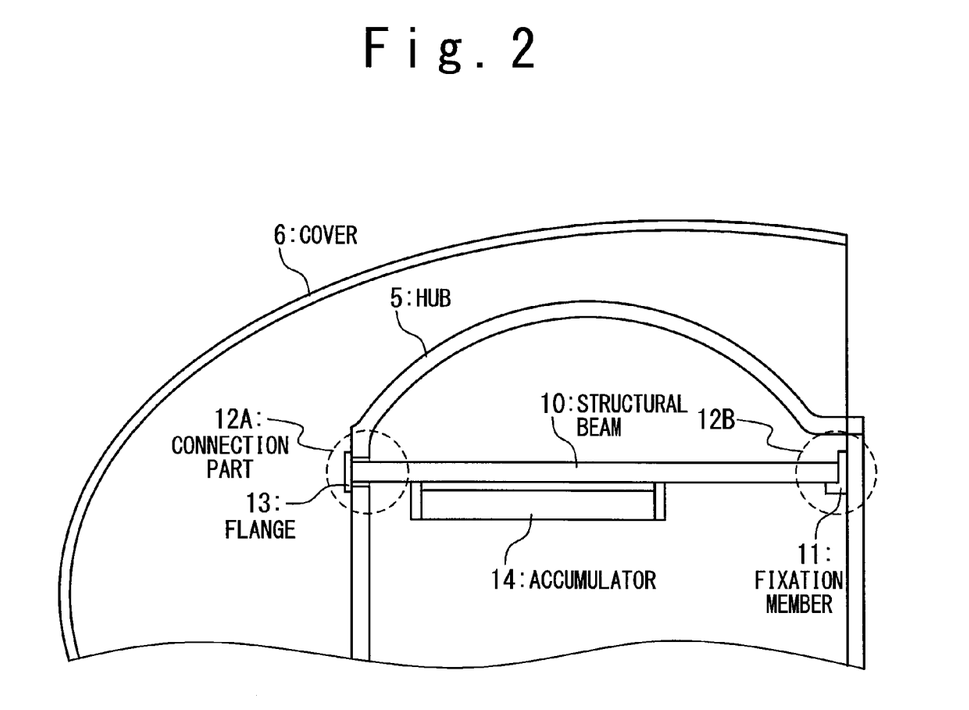
FIG. 2 is a sectional view of a hub when viewed from a side.
Figure 3:
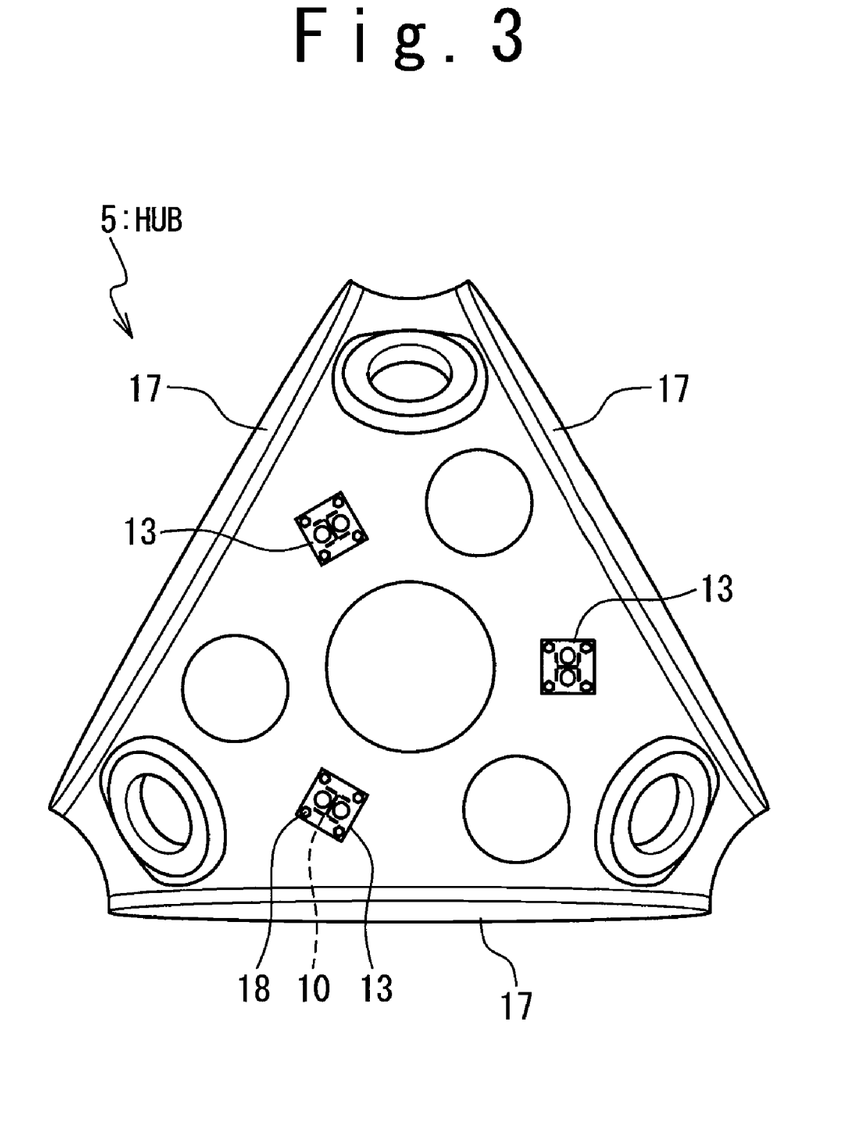
FIG. 3 is a front view of the hub.

Some embodiments of the present invention will be described referring to the attached drawings. A wind turbine in the present embodiment has a configuration shown in FIG. 1. FIG. 2 is a sectional view of the hub 5 of the wind turbine 1 when viewed from a side. FIG. 3 is a diagram of the hub 5 when viewed from the front, that is, an opposite side to the nacelle 3. In an example shown in FIG. 3, the blades 7 are attached to respective of blade roots 17 provided at three sections in the circumference of the hub 5.

A structural beam 10 as a frame for mounting equipment thereon is installed in the hub 5. Various supporting structures such as beams made of square steel, I-steel and aluminum alloy can be adopted as the structural beam 10. The structural beam 10 in the present embodiment is made of H-steel. In an example shown in FIG. 2, the structural beam 10 extends in substantially parallel with the main shaft 4. A fixation part 12B as a rear part of the structural beam 10, that is, an end on the side close to the nacelle 3 is rigidly connected to the hub 5 via a fixation member 11. A front part of the structural beam 10, that is, a side close to the front end of the hub 5 is flexibly connected to the hub 5 at a connection part 12A. The structural beam 10 may be disposed within the hub 5 in any fashion. In the example shown in FIG. 3, three structural beams 10 and hydraulic cylinders not shown are alternately disposed about the rotational center of the hub 5 and in substantially parallel with the main shaft. Such configuration constitutes a semi-flexible frame.

The structural beam 10 can support various equipment. For example, a control board for controlling operations of the wind turbine, and a PLC (Programmable Logic Controller) for controlling the pitch and various sensors and a battery in the case of the wind turbine that electrically control the pitch may be mounted on the structural beam 10. In the present embodiment, an accumulator 14 of the hydraulic system for changing the pitch of the blade 7 attached to the hub 5 is installed on each of the three structural beams 10 correspondingly to each of the blades 7.

Figure 4:
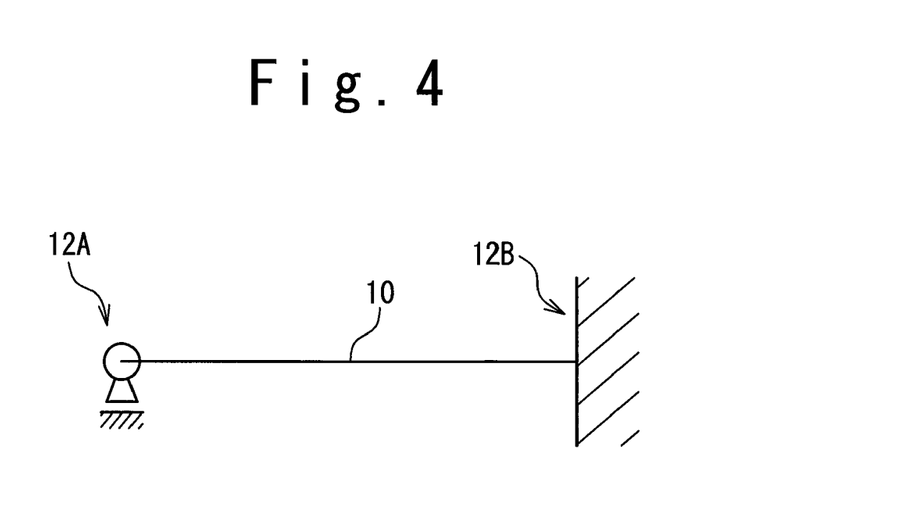
FIG. 4 is a schematic view of a supporting structure of a structural beam.

FIG. 4 is a schematic view of the supporting structure of the structural beam 10 in the present embodiment. One end of the structural beam 10 is rigidly connected to the hub 5 at the fixation part 12B and the other end of the structural beam 10 is flexibly connected to the connection part 12A. With such structure, when the hub 5 is distorted due to the self-weight or the wind pressure at rotation of the wind turbine, the distortion is absorbed by the connection part 12A with flexible structure. For this reason, the stress applied to the structural beam 10 by the distortion of the hub 5 is suppressed. In comparison with a strong member with rigid structure having enough large strength to prevent influence of the distortion of the hub 5, this structure can support various equipment in the hub 5 with a lighter weight.

FIG. 1 to FIG. 3 illustrate the example of an upwind-type wind turbine in which one end of the structural beam 10 is rigidly connected at the rear part of the hub 5 (leeward side) and the other end of the structural beam 10 is flexibly connected to the front part of the hub 5 (windward side). However, for applying to wind turbines having other structures, the supporting structure shown in FIG. 4 in which one end is rigidly connected and the other end is flexibly connected can achieve similar effects. For example, even when the structural beam 10 is disposed in a longitudinal direction as a direction diagonal to the direction of back and forth of the hub 5, as long as one end and the other end of the structural beam 10 are rigidly connected to and flexibly connected to the hub 5, respectively, the stress applied to the structural beam 10 can be suppressed. Also in the case of the downwind-type wind turbine, even when the structural beam 10 is disposed in any direction, the similar effects can be obtained.

Figure 5:
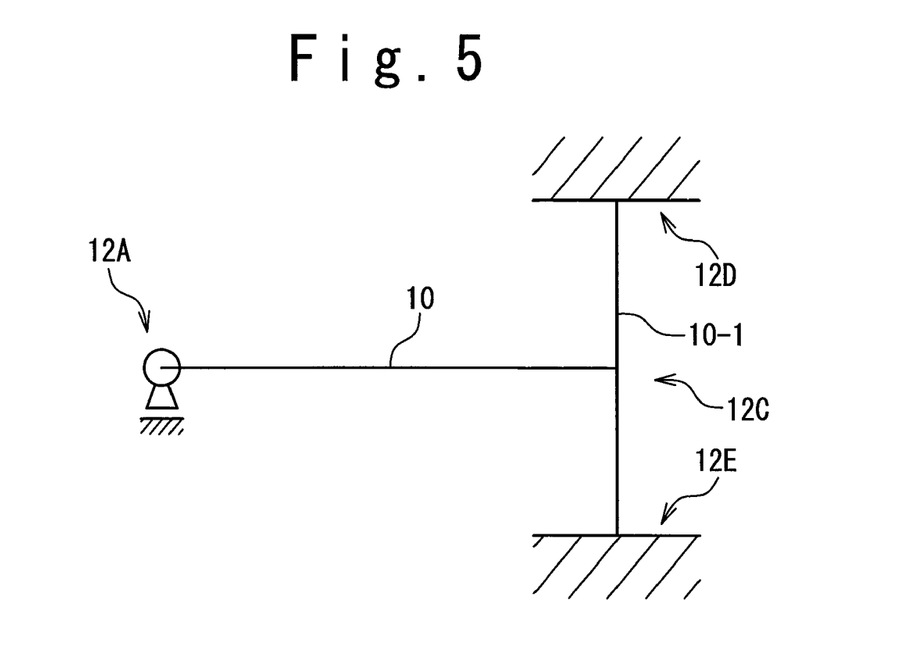
FIG. 5 is a schematic view of a supporting structure of the structural beam.

In FIG. 4, it is characterized by that one end of the structural beam 10 is flexibly connected to the hub 5, and the fixation part 12B on a side of rigid connection may have other structures as long as it fixes the end of the structural beam 10 to the hub 5. FIG. 5 shows an example of such other structures. A plurality of structural beams 10, 10-1 are disposed within the hub 5. One end of the structural beam 10-1 is fixed to the hub 5 at a fixation part 12D and the other end is fixed to the hub 5 at a fixation part 12E. One end of the structural beam 10 is fixed to a fixation part 12C located in the middle of both ends of the structural beam 10-1. The other end of the structural beam 10 is flexibly connected to the hub 5 at the connection part 12A. Even with such structure, the stress applied to the structural beam 10 can be suppressed.

Figure 6:
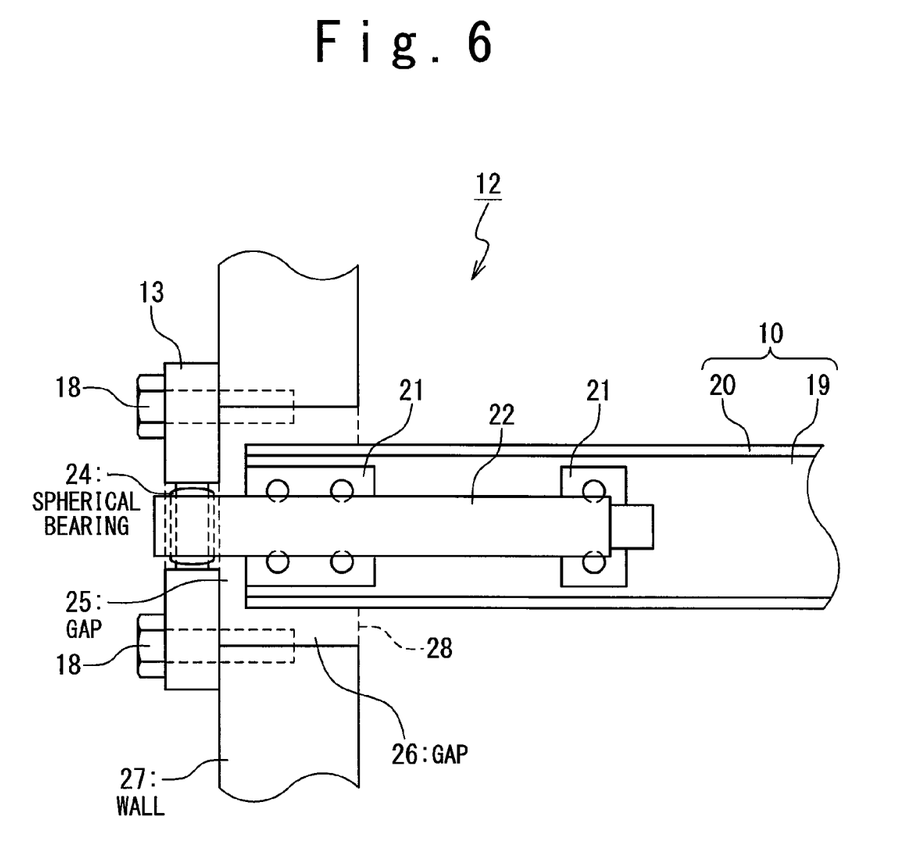
FIG. 6 shows details of a connection part.

FIG. 6 shows details of the connection part 12A. At the connection part 12A, a through hole is provided on a wall 27 forming the hub 5. On the external side of the through hole, that is, the external side of the hub 5, a flange 13 is fixed to the wall 27 by means of bolts 18 so as to cover the through hole. The flange 13 has a substantially same center axis as the extending direction of the structural beam 10 and has a circular hole opened to the internal side of the hub 5. Although the hole is a through hole opened to the internal side as well as the external side of the hub 5 in an example shown in FIG. 6, the hole does not necessarily penetrate. A spherical bearing 24 is fixed to an inner wall of the through hole by welding.

The structural beam 10 in the present embodiment is a so-called H-steel formed of a web 19 and a flange 20. A pin 22 having a cylindrical shape is attached to the web 19 via a holder 21. By pin connection connecting the structural beam 10 to the supporting member of the flexible structure via the pin 22, the connection part 12A which is rigidly fixed in the radial direction and flexibly connected to be free in the moment and in the axial direction within the range of distortion of the hub 5 is achieved. The longitudinal direction of the structural beam 10 is substantially same as that of the pin 22. The pin 22 is attached so as to be rotatable about a central axis oriented in the longitudinal direction with respect to the structural beam 10. The ability to rotate makes the connection part 12A more flexible. The front end of the pin 22 on the front side protrudes farther than the front end of the structural beam 10 on the front side.

The front end of the structural beam 10 is disposed within the through hole of the wall 27. That is, the front end of the structural beam 10 is located on a front side at a position closer to the flange 13 rather than the plane 28 formed by extending the plane formed of the inner wall surface of the wall 27 up to a position of the through hole. A gap 25 exists between the front end of the structural beam 10 and the flange 13. In addition, a gap 26 exists between the structural beam 10 and the inner wall surface of the through hole of the wall 27. Since the front end of the structural beam 10 is located within the thickness of the wall of the hub 5, even when a strong force is applied to the connection part 12A in some unexpected situation, the end of the structural beam 10 can be held in the through hole of the hub 5.

The end of the pin 22 is inserted into the spherical bearing 24. The spherical bearing 24 is a radial bearing and the pin 22 can slide in the thrust direction of the spherical bearing 24. When the distance between the fixation part 12B and the connection part 12A changes due to the distortion of the hub 5, the pin 22 slides with respect to the spherical bearing 24. By this movement, it is possible to suppress the stress applied to the structural beam 10. By such a configuration, the flexible connection to the hub 5 in the longitudinal direction of the structural beam 10 is realized.

Since each structural beam 10 is supported by the spherical bearing 24 via one pin 22 and there are the gaps 25, 26, the structural beam 10 can pivot about the spherical bearing 24. By such a configuration, the flexible connection to the hub 5 in a pivotal direction of the structural beam 10 is realized. The pin 22 is supported by the spherical bearing 24 in the radial direction in this manner, thereby achieving flexible connection of the connection part 12A.

In place of the connection part 12A shown in FIG. 6, the flexible connection can be realized by other structures. For example, by supporting the pin 22 in the radial direction by rubber bushing in place of the spherical bearing 24, a flexible structure can be realized as in the case of using the spherical bearing 24.

Figure 7A:
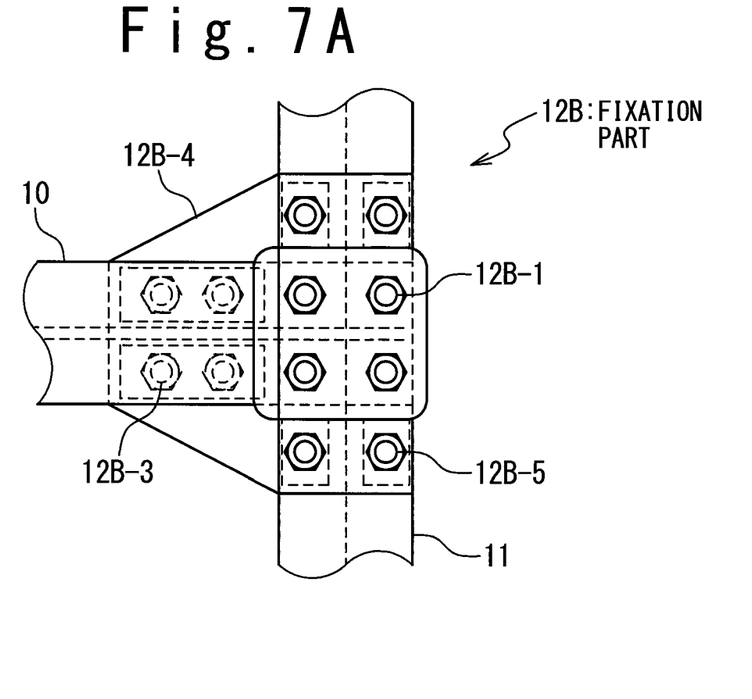
FIG. 7A shows details of a fixation part.
Figure 7B:
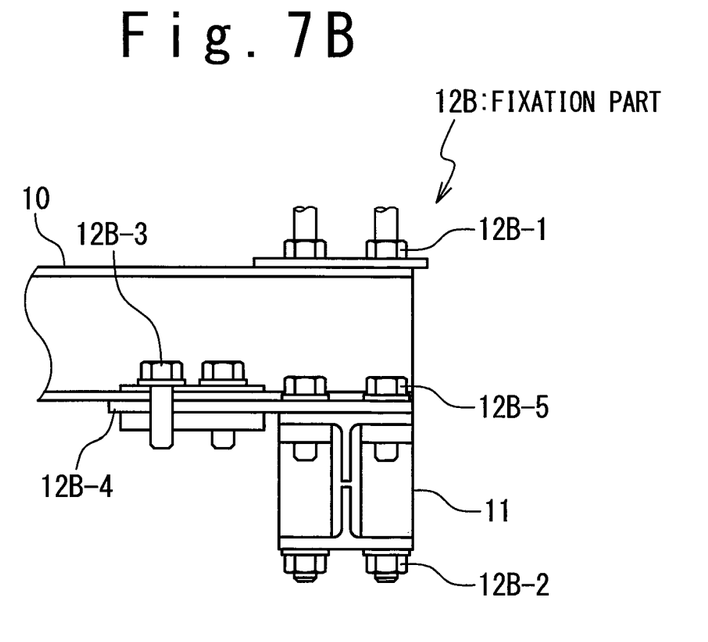
FIG. 7B shows details of the fixation part.

FIGS. 7A and 7B are a plan view and a side view of the fixation part 12B, respectively. In this example, the fixation member 11 in FIG. 2 is made of H-steel. The fixation member 11 is fixed to the hub 5. A fixing end (an end on the side of the fixation part 12B) of the structural beam 10 is fixed to the fixation member 11 by bolts and nuts 12B-1, 12B-2 in an area where planes of the structural beam 10 and the fixation member 11 overlap each other. The structural beam 10 is further fixed to a reinforcing metal fitting 12B-4 by bolts and nuts 12B-3. The reinforcing metal fitting 12B-4 is fixed to the fixation member 11 by bolts and nuts 12B-5. The structural beam 10 and the fixation member 11 are fixed to each other by the reinforcing metal fitting 12B-4 in a larger area where their planes overlaps with each other.

As shown in FIGS. 7A and 7B, the structural beam 10 is rigidly connected at the fixation part 12B so as not to cause shift or twist. By forming such rigid connection on one end and flexible connection at the connection part 12A on the other end, an excessive force is not applied to a structure of the strong member that supports various equipment in the hub 5.

With such configuration, when the hub 5 rotates to deform the hub 5 and structures within the hub 5, relative displacement between the structural beam 10 and the hub 5 can be absorbed by flexible connection. Consequently, a wind turbine having a frame which can support the equipment disposed in the hub 5 and is highly durable to rotation can be realized.

Figure 8:
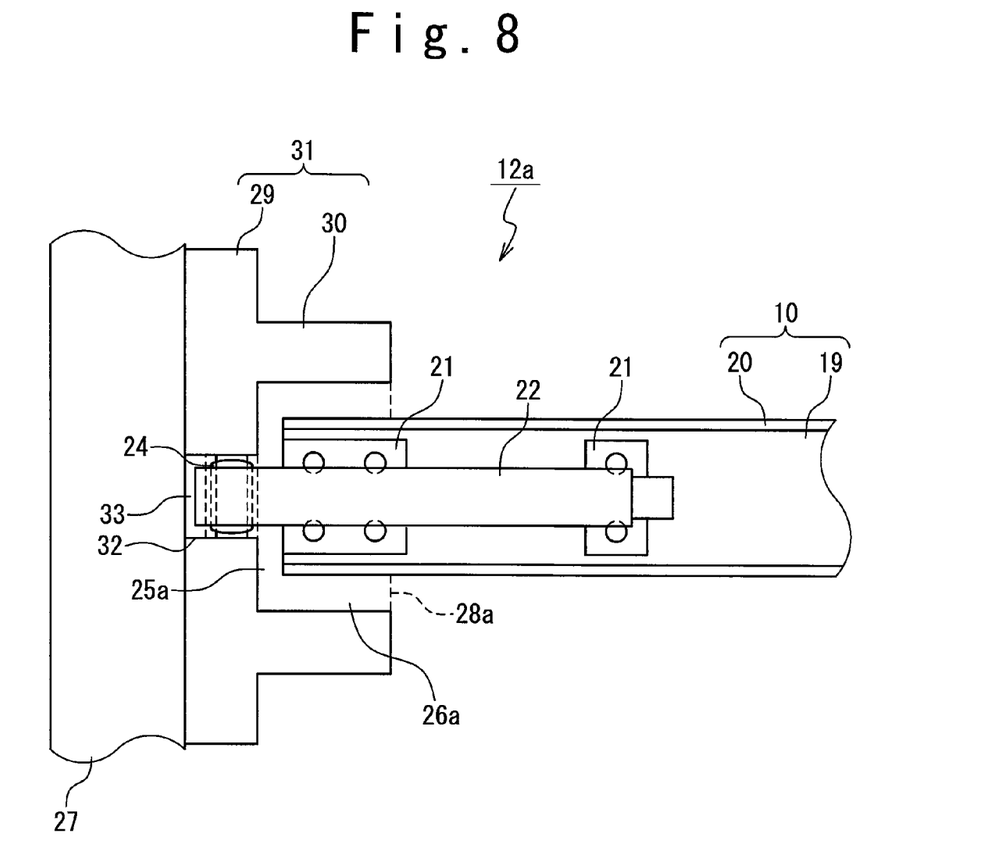
FIG. 8 shows details of the connection part.

FIG. 8 shows another example of the flexibly connected connection part 12A. In this example, unlike the connection part 12 shown in FIG. 6, it is no need to form a through hole on the wall 27 of the hub 5. The connection part 12A has a flange 31 shown in FIG. 8. A flat plate part 29 of the flange 31 is fixed to an inner side surface of the wall 27 of the hub 5. The flange 31 has a recess portion that is located on the inner side of the hub 5 with respect to the flat plate part 29 and encloses the end of the structural beam 10 on the side of the connection part 12A. In an example shown in FIG. 8, the recess portion is formed of a hollow cylindrical member 30 having a central axis in the longitudinal direction of the structural beam 10. The front end of the structural beam 10 is located at an inner position of the flange 31 to the hub 5 than a plane 28a formed of a front end of the cylindrical member 30. With such configuration, as in the case shown in FIG. 6, even when a strong force is applied to the connection part 12A in some unexpected situation, the end of the structural beam 10 can be held in the flange 31.

Like the flange 13 in FIG. 4, a hole 32 for attaching the spherical bearing 24 is provided on the flat plate part 29. A gap 33 is formed between the end of the pin 22 supported by the spherical bearing 24 and the wall 27 of the hub 5. A gap 26a is formed between an inner circumferential surface of the cylindrical member 30 of the flange 31 and the structural beam 10. A gap 25a is formed between the flat plate part 29 of the flange 31 and the end of the structural beam 10, which is opposite to the flat plate part 29. By these gaps, the flexible connection is realized, where the structural beam 10 is able to pivot at the spherical bearing 24 within a predetermined range and slide in the longitudinal direction.

Although the present invention has been described referring to some embodiments, the present invention is not limited to the above-mentioned embodiments and the above-mentioned embodiments can be variously modified.

[Explanation of Reference Numerals]
1 WIND TURBINE
2 TOWER
3 NACELLE
4 MAIN SHAFT
5 HUB
6 COVER
7 BLADE
8 GEAR BOX
9 GENERATOR
10 STRUCTURAL BEAM
11 FIXATION MEMBER
12A CONNECTION PART
12B FIXATION PART
13 FLANGE
14 ACCUMULATOR
15 STRUCTURAL BEAM
17 BLADE ROOT
18 BOLT
19 WEB
20 FLANGE
21 HOLDER
22 PIN
24 SPHERICAL BEARING
25, 25a GAP
26, 26a GAP
27 WALL
28 SURFACE FORMED BY INTERNAL DIRECTION SIDE EDGE OF HUB 5
29 FLAT PLATE PART
30 CYLINDRICAL MEMBER
31 FLANGE
32 HOLE
33 GAP

What is claimed is:

1. A wind turbine for converting a wind power into a torque by a blade attached to a hub, said wind turbine comprising:
a frame configured to support equipment disposed in the hub;
a fixation part configured to fix one end of the frame to the hub; and
a connection part configured to connect another end of the frame to the hub with a flexible connection,
wherein at the connection part, the frame is flexibly connected to the hub in a pivotal direction.

2. The wind turbine according to claim 1, wherein the connection part comprises:
a flange fixed to a wall of the hub and having a hole; and
a spherical bearing fixed inside the hole, and
wherein the frame comprises a pin connected to one end of the frame on a side of the connection part, and
the connection part forms the flexible connection in the pivotal direction by supporting the pin by the spherical bearing.

3. The wind turbine according to claim 2, wherein
the hole penetrates the flange,
a through hole is formed in the wall of the hub at the connection part,
the flange is attached to an external surface of the hub to cover the through hole, and
an end of the frame on a side of the connection part is arranged inside the through hole.

4. The wind turbine according to claim 2, wherein
the flange is fixed to an internal surface of the hub, and
the flange includes a recess portion that encloses one end of the frame on a side of the connection part.

5. The wind turbine according to claim 2, wherein a gap is formed between the frame and the flange.

6. The wind turbine according to claim 2, wherein
the spherical bearing is a radial bearing, and
the connection part forms a flexible connection in a longitudinal direction of the frame by the pin being slidably connected to the spherical bearing in a thrust direction.

7. The wind turbine according to claim 1, wherein the frame is connected to the hub flexibly in a longitudinal direction of the frame at the connection part.

8. The wind turbine according to claim 1, wherein the equipment includes an accumulator of a hydraulic system for changing a pitch of the blade attached to the hub or a control board for controlling an operation of the wind turbine.

* * * * *